Sept. 12, 1933.   A. WARMISHAM   1,926,569
PHOTOGRAPHIC AND PROJECTION LENS
Filed April 10, 1931

INVENTOR
Arthur Warmisham
BY
Arthur L. Kent
his ATTORNEY

Patented Sept. 12, 1933

1,926,569

UNITED STATES PATENT OFFICE 1,926,569

PHOTOGRAPHIC AND PROJECTION LENS

Arthur Warmisham, Leicester, England, assignor to Kapella Limited, Leicester, England, a corporation of England Application April 10, 1931, Serial No. 529,168, and in Great Britain April 11, 1930

6 Claims. (Cl. 88—57)

This invention relates to photographic and projection lenses of the kind hitherto comprising five separate simple members, of which, counting from that end of the system which, in use, is generally turned toward the longer conjugate, the first member is convergent, the second and third are divergent and bi-concave, and the fourth and fifth are convergent. A lens of this kind is illustrated in Fig. 10 of British Patent No. 168,923.

The object of the present invention is to provide lenses of greater aperture than has hitherto been attained with improved correction of zonal spherical aberration simultaneously with improved approximation to field flatness.

These improvements are obtained, according to the present invention, partly by constructing the first member and one or both of the fourth and fifth members as cemented doublets the cemented surfaces of which are convergent, and concave toward the longer conjugate, and partly by making the second and third elements unsymmetrical and presenting their faces of weaker curvature toward each other.

Two suitable lens systems are shown, by way of example, in the accompanying drawing, in which.

Figure 1:
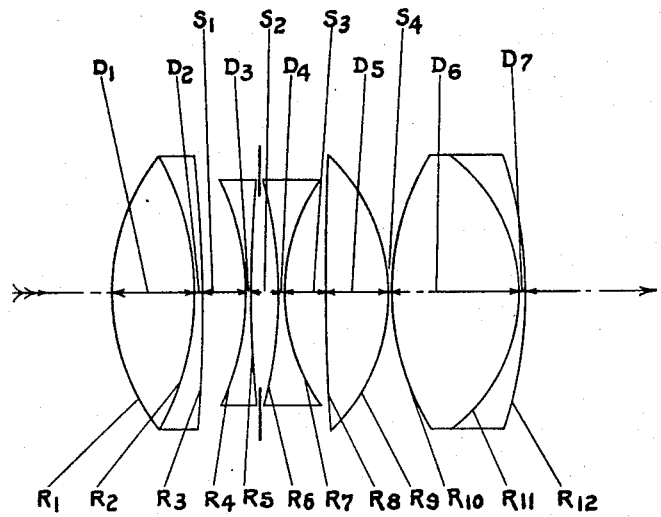
Fig. 1 shows in section the members of a lens system constructed according to this invention, the light being supposed to pass in the direction shown by the arrow from the long conjugate to the short conjugate.

In the lens system shown in Fig. 1 the first member comprises two elements $D_1$, $D_2$, cemented together at the surface $R_2$ which is concave toward the longer conjugate. The fifth member comprises the two elements $D_6$ and $D_7$ cemented together at their common surface $R_{11}$, also concave toward the longer conjugate, the members $D_3$ and $D_4$ of the system being simple unsymmetrical bi-concave lenses with their surfaces of weaker curvature facing one another. The fourth member $D_5$ remains a simple convergent element.

Figure 2:
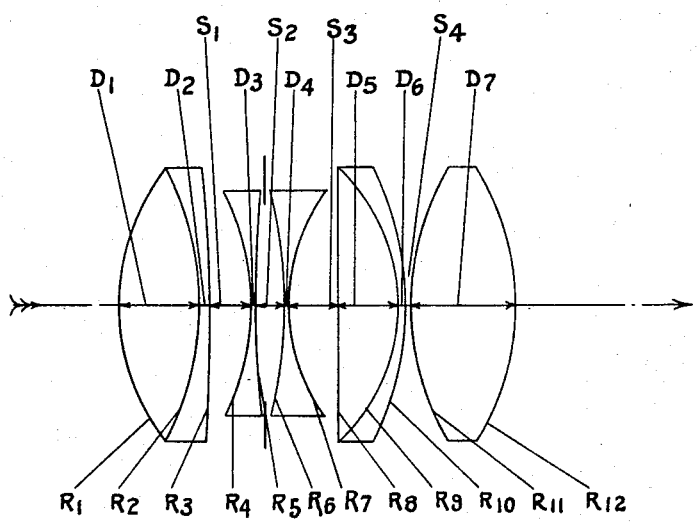
Fig. 2 shows in section another lens system constructed according to this invention.

Fig. 2 illustrates another example constructed according to this invention, and this system differs from the example shown in Fig. 1, in that the fifth member $D_7$ is a simple convergent element, while the fourth member is compounded of the two elements $D_5$ and $D_6$ cemented together at their common surface $R_9$, concave toward the longer conjugate.

In the above descriptions the letters $D_1$, $D_2$, etc., have been used to indicate the separate elements in the system, but hereafter will be used to indicate the thicknesses of such elements.

Below are given data for the construction of the examples illustrated in the drawing. The notation is that the successive radii of curvature, counting from the front, are called $R_1$, $R_2$, etc., the sign + denoting that the curve is convex toward the longer conjugate, and — that it is concave toward the same.

The radii of the surfaces are denoted in sequence by $R_1$, $R_2$, etc., the axial thicknesses of the elements by $D_1$, $D_2$, etc., and the separations of the members by $S_1$, $S_2$, etc.

The material is defined in terms of the mean refractive index $n_D$, as conventionally employed, followed by the Abbe V number.

An objective as illustrated in Fig. 1, spherically corrected for an aperture F/1.0, and having an anastigmatically flattened field of semi-angle 14°, may be constructed as follows:

Equivalent focal length .97. Clear aperture (front) .97

| | | | $n_D$ | V |
|---|---|---|---|---|
| $R_1$ + .8430 | $D_1$ .305 | | 1.6234 | 56.3 |
| $R_2$ —1.111 | $D_2$ .030 | | 1.5290 | 51.6 |
| $R_3$ —6.666 | $S_1$ .150 | Air | | |
| $R_4$ — .9524 | $D_3$ .030 | | 1.6940 | 30.7 |
| $R_5$ +6.666 | $S_2$ .075 | Air | | |
| $R_6$ —1.755 | $D_4$ .030 | | 1.6940 | 30.7 |
| $R_7$ + .7143 | $S_3$ .150 | Air | | |
| $R_8$ +8.333 | $D_5$ .220 | | 1.6437 | 48.3 |
| $R_9$ — .7101 | $S_4$ .002 | Air | | |
| $R_{10}$+1.000 | $D_6$ .470 | | 1.6234 | 56.3 |
| $R_{11}$— .6305 | $D_7$ .049 | | 1.529 | 51.6 |
| $R_{12}$—1.611 | | | | |

An objective as illustrated in Fig. 2, having similar properties, may be constructed as follows:

|  |  |  | $n_D$ | $V$ |
|---|---|---|---|---|
| $R_1 + .8430$ | $D_1\ .305$ | -------- | 1.6234 | 56.3 |
| $R_2 -1.111$ | $D_2\ .030$ | -------- | 1.5290 | 51.6 |
| $R_3 -6.666$ | $S_1\ .150$ | Air | | |
| $R_4 - .9524$ | $D_3\ .030$ | -------- | 1.6940 | 30.7 |
| $R_5 +6.666$ | $S_2\ .075$ | Air | | |
| $R_6 -1.755$ | $D_4\ .030$ | -------- | 1.6940 | 30.7 |
| $R_7 + .7143$ | $S_3\ .150$ | Air | | |
| $R_8\ \infty$ | $D_5\ .220$ | -------- | 1.6234 | 56.3 |
| $R_9 - .7$ | $D_6\ .049$ | -------- | 1.529 | 51.6 |
| $R_{10} -1.2$ | $S_4\ .002$ | Air | | |
| $R_{11} +1.0$ | $D_7\ .380$ | -------- | 1.6437 | 48.3 |
| $R_{12} -1.0$ | | | | |

What is claimed is:

1. A lens comprising in series a convergent member, two divergent and bi-concave members, and two convergent members, all of said members being separated from each other, while the first convergent member and one of the last mentioned convergent members are compound, with each of the cemented surfaces convergent and concave toward the longer conjugate, all of said members cooperating as constituent parts of a single lens having an aperture of the order of magnitude of unity to produce an image corrected for spherical aberration, astigmatism and curvature of field.

2. A lens as claimed in claim 1, in which the second and third members are unsymmetrical and present their faces of weaker curvature towards each other.

3. A lens comprising in series a convergent member, two divergent and bi-concave members and two convergent members, all of said members being separated from each other, while the first and fourth members are compound with each of the cemented surfaces convergent and concave toward the longer conjugate, all of said members cooperating as constituent parts of a single lens having an aperture of the order of magnitude of unity to produce an image corrected for spherical aberration, astigmatism and curvature of field.

4. A lens comprising in series a convergent member, two divergent and bi-concave members and two convergent members, all of said members being separated from each other, while the first and fifth members are compound, with each of the cemented surfaces convergent and concave toward the longer conjugate, all of said members cooperating as constituent parts of a single lens having an aperture of the order of magnitude of unity to produce an image corrected for spherical aberration, astigmatism and curvature of field.

5. An objective as claimed in claim 3, in which the second and third members are unsymmetrical and present their faces of weaker curvature toward each other.

6. An objective as claimed in claim 4, in which the second and third members are unsymmetrical and present their faces of weaker curvature toward each other.

ARTHUR WARMISHAM.